United States Patent
Niwa et al.

(10) Patent No.: US 10,760,477 B2
(45) Date of Patent: Sep. 1, 2020

(54) TURBOCHARGER ENGINE

(71) Applicant: MAZDA MOTOR CORPORATION, Hiroshima (JP)

(72) Inventors: Yasushi Niwa, Higashihiroshima (JP); Yoshiyuki Uehane, Hiroshima (JP); Keiji Araki, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 655 days.

(21) Appl. No.: 15/609,766

(22) Filed: May 31, 2017

(65) Prior Publication Data

US 2017/0342894 A1 Nov. 30, 2017

(30) Foreign Application Priority Data

May 31, 2016 (JP) .................................. 2016-109078

(51) Int. Cl.
F02B 37/00 (2006.01)
F04D 29/42 (2006.01)
F04D 17/14 (2006.01)
F02B 37/013 (2006.01)
F02B 37/18 (2006.01)
(Continued)

(52) U.S. Cl.
CPC .......... *F02B 37/004* (2013.01); *F02B 37/013* (2013.01); *F02B 37/18* (2013.01); *F04D 17/127* (2013.01); *F04D 17/14* (2013.01); *F04D 25/04* (2013.01); *F04D 29/4206* (2013.01); *Y02T 10/144* (2013.01)

(58) Field of Classification Search
CPC .... F02B 37/002; F02B 37/004; F02B 37/013; F02B 37/18

USPC .............................................. 60/612; 123/562
See application file for complete search history.

(56) References Cited

U.S. PATENT DOCUMENTS 7,174,777 B2 2/2007 Fischer et al.
8,720,421 B2 5/2014 Niwa et al.
(Continued)

FOREIGN PATENT DOCUMENTS

CN 101091041 A 12/2007
CN 102312721 B 5/2015
(Continued)

OTHER PUBLICATIONS

An Office Action issued by the German Patent Office dated Oct. 12, 2018, which corresponds to German Patent Application No. 102017111729.6 and is related to U.S. Appl. No. 15/609,766; with English Translation.
(Continued)

*Primary Examiner* — Ngoc T Nguyen
(74) *Attorney, Agent, or Firm* — Studebaker & Brackett PC

(57) ABSTRACT

A turbocharger engine includes a dual stage turbocharger in which a first turbo unit is disposed on the upstream side of a second turbo unit on an exhaust passage. The turbocharger is disposed in such a manner that a second turbine shaft of the second turbo unit is far from an engine output shaft than a first turbine shaft of the first turbo unit in a plan view in an axis direction of a cylinder. Further, a second turbine is rotated clockwise around an axis thereof in a side view when the turbocharger is viewed from the side of the turbine, and an intra-turbine passage is disposed on the side of an engine body than the second turbine shaft.

12 Claims, 8 Drawing Sheets

(51) Int. Cl.
  *F04D 25/04* (2006.01)
  *F04D 17/12* (2006.01)

(56) References Cited

U.S. PATENT DOCUMENTS

| | | | |
|---|---|---|---|
| 2005/0126169 A1 | 6/2005 | Ruess | |
| 2006/0042247 A1 | 3/2006 | Haugen | |
| 2009/0060719 A1 | 3/2009 | Haugen | |
| 2010/0313561 A1* | 12/2010 | Niwa | B60K 13/04 60/602 |
| 2011/0131985 A1* | 6/2011 | Smatloch | F02B 37/183 60/614 |
| 2012/0000196 A1* | 1/2012 | Niwa | F02B 37/013 60/602 |
| 2013/0269341 A1* | 10/2013 | Kurata | F02B 37/004 60/605.2 |
| 2017/0342895 A1* | 11/2017 | Niwa | F02B 37/013 |

FOREIGN PATENT DOCUMENTS

| | | | | |
|---|---|---|---|---|
| DE | 10230934 A1 | | 1/2004 | |
| DE | 10 2011 104 450 A1 | | 1/2012 | |
| DE | 102014217333 A1 | * | 3/2015 | ............ F02B 37/013 |
| DE | 102018218886 A1 | * | 5/2019 | ............ F02B 37/013 |
| EP | 2660439 A1 | * | 11/2013 | ............ F02B 37/013 |
| JP | H04-255527 A | | 9/1992 | |
| JP | 2008-514842 A | | 5/2008 | |
| JP | 2012-140890 A | | 7/2012 | |
| JP | 2013-060820 A | | 4/2013 | |
| JP | 5499953 B2 | | 5/2014 | |
| WO | WO-2017169982 A1 | * | 10/2017 | ............ F02B 37/004 |

OTHER PUBLICATIONS

An Office Action issued by the Japanese Patent Office dated Mar. 27, 2018, which corresponds to Japanese Patent Application No. 2016-109078 and is related to U.S. Appl. No. 15/609,766; with English translation.

An Office Action mailed by the State Intellectual Property Office of the People's Republic of China dated Jan. 28, 2019, which corresponds to Chinese Patent Application No. 201710389512.5 and is related to U.S. Appl. No. 15/609,766.

* cited by examiner

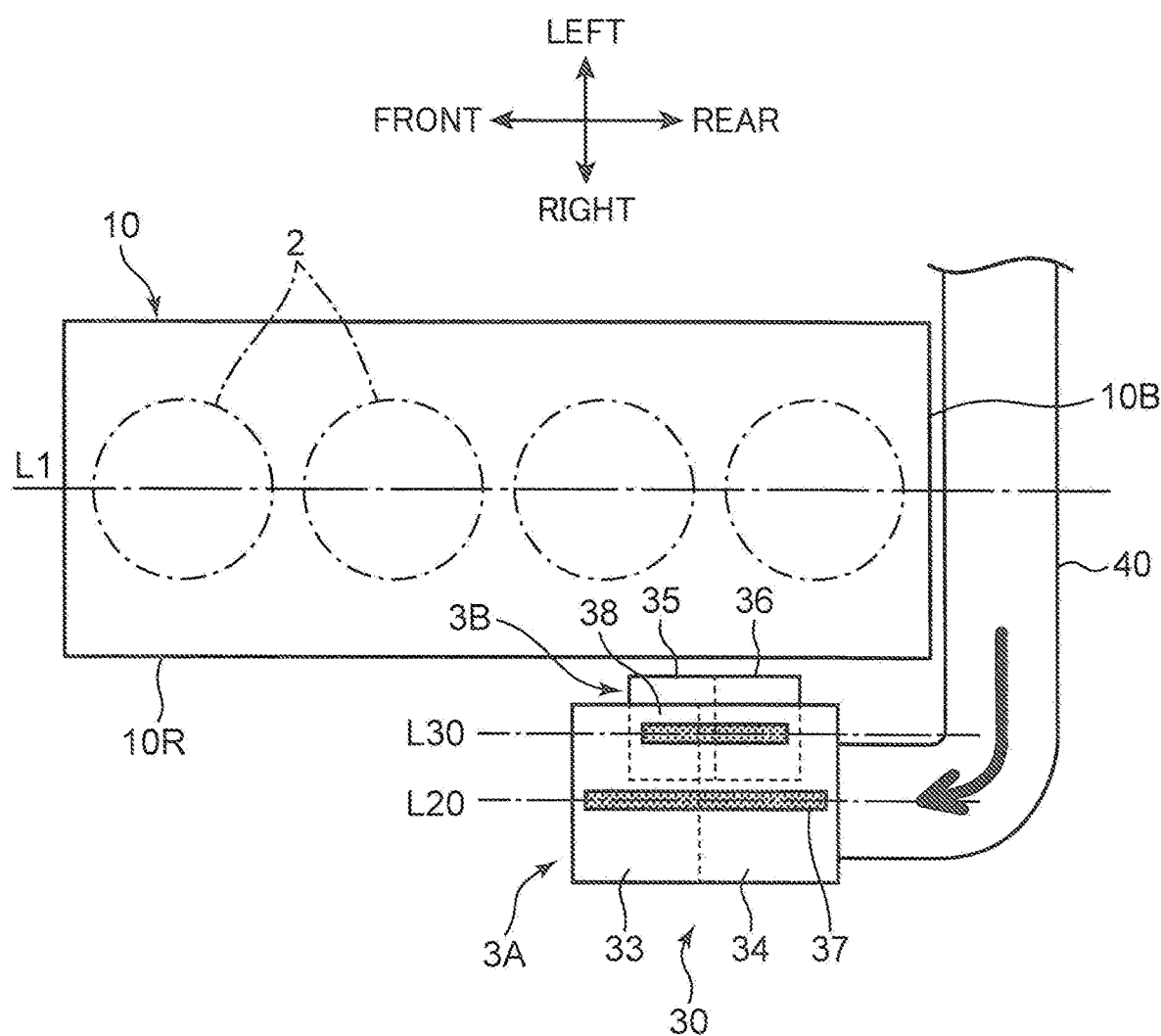

TURBOCHARGER ENGINE

TECHNICAL FIELD

The present invention relates to a turbocharger engine provided with a turbocharger including two independent turbo units in an engine body.

BACKGROUND ART

In a turbocharger engine, a turbocharger configured to supercharge intake air by using exhaust energy of an engine is mounted adjacent to a side wall of an engine body. An exhaust passage and an intake passage are formed in a housing of the turbocharger. A turbine chamber configured to accommodate a turbine communicates with the exhaust passage. A compressor chamber configured to accommodate a compressor impeller communicates with the intake passage. Exhaust air is supplied to the exhaust passage from the engine body, and intake air to be supplied to the engine body flows through the intake passage. The turbine is rotated around a turbine shaft by exhaust air to rotate the compressor impeller in the compressor chamber, which is connected to the turbine shaft to supercharge intake air.

Conventionally, there is known a turbocharger in which two independent turbo units are disposed in series in an exhaust passage. For instance, U.S. Pat. No. 8,720,421 discloses a dual stage turbocharger provided with a large turbo unit configured to be operated in all speed ranges of an engine and a small turbo unit configured to be mainly operated in a low speed range of the engine. Each of the large turbo unit and the small turbo unit includes a turbine chamber, a compressor chamber, and a turbine shaft extending between the turbine chamber and the compressor chamber.

In a turbocharger, there are always two demands i.e. a demand for increasing an output by efficiently transmitting kinetic energy from exhaust air to a turbine, and a demand for miniaturization. In the aforementioned dual stage turbocharger, the structure of an exhaust passage, particularly, the structure of an intra-turbine exhaust passage communicating between two turbine chambers tends to be complicated. This may cause a resistance against a flow of exhaust air in the exhaust passage, and kinetic energy for driving a turbine may be lost. Therefore, satisfying the aforementioned two demands at a high level is a challenging task.

SUMMARY OF INVENTION

An object of the present invention is to provide a turbocharger engine provided with a turbocharger including two independent turbo units, which enables to give large kinetic energy from exhaust air to turbines, and to attain miniaturization.

In order to attain the aforementioned object, a turbocharger engine according to an aspect of the present invention includes an engine body provided with a cylinder and an engine output shaft; and a turbocharger disposed adjacent to the engine body, and including an exhaust passage through which exhaust air is supplied from the engine body, and an intake passage through which intake air is supplied to the engine body to supercharge the intake air.

The turbocharger includes a first turbo unit and a second turbo unit. The first turbo unit includes a first turbine chamber communicating with the exhaust passage and configured to accommodate a first turbine, a first compressor chamber communicating with the intake passage and configured to accommodate a first compressor, and a first turbine shaft extending between the first turbine chamber and the first compressor chamber to connect between the first turbine and the first compressor. The second turbo unit includes a second turbine chamber communicating with the exhaust passage and configured to accommodate a second turbine, a second compressor chamber communicating with the intake passage and configured to accommodate a second compressor, and a second turbine shaft extending between the second turbine chamber and the second compressor chamber to connect between the second turbine and the second compressor.

The first turbine chamber is disposed on an upstream side of the second turbine chamber in the exhaust passage. The first turbine shaft and the second turbine shaft are disposed to extend generally in a same direction as the engine output shaft. The second turbo unit is disposed with respect to the engine body in such a manner that the second turbine shaft is far from the engine output shaft than the first turbine shaft in a plan view in an axis direction of the cylinder.

In a side view when the first turbine shaft and the second turbine shaft are viewed from a side of the first turbine chamber and the second turbine chamber, the engine body is located on a left side of the second turbo unit. The second turbine shaft is rotated clockwise around an axis thereof. An intra-turbine passage from an exit of the first turbine chamber to an entrance of the second turbine chamber is disposed on a side of the engine body than the second turbine shaft.

These and other objects, features and advantages of the present invention will become more apparent upon reading the following detailed description along with the accompanying drawings.

BRIEF DESCRIPTION OF DRAWINGS

FIG. 8 is a top plan view illustrating a layout of a turbocharger as a modification of the embodiment.

DESCRIPTION OF EMBODIMENTS

Schematic Configuration of Engine

Figure 1:
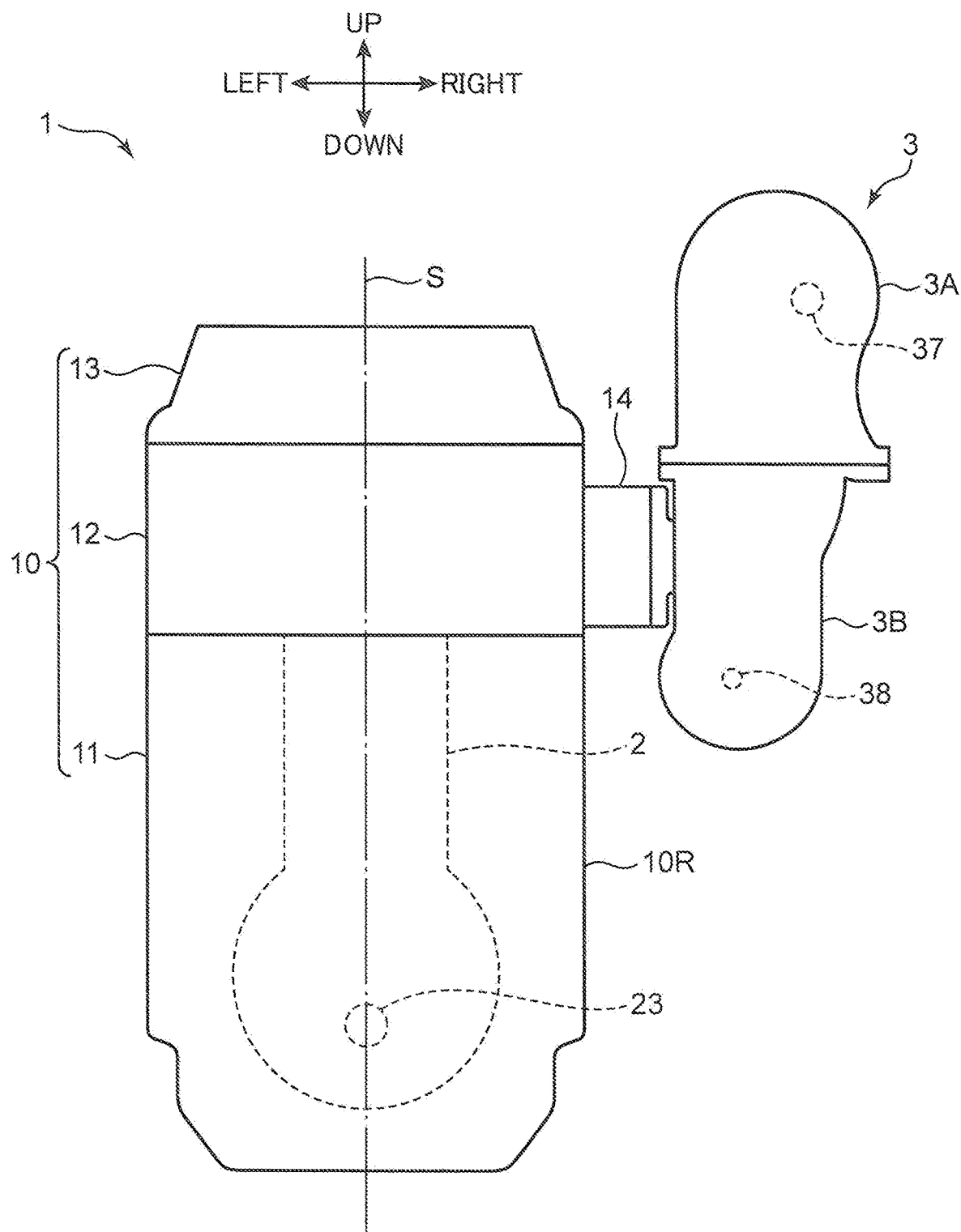
FIG. 1 is a schematic side view of a turbocharger engine according to an embodiment of the present invention.

In the following, a turbocharger engine according to an embodiment of the present invention is described in detail based on the drawings. First of all, a schematic configuration of the engine is described. FIG. 1 is a perspective view of a turbocharger engine 1 according to the embodiment of the present invention. In FIG. 1 and the other drawings, a front direction, a rear direction, a left direction, a right direction, an upper direction, and a lower direction are indicated. This is for the sake of explanation, and does not necessarily indicate actual directions.

The turbocharger engine 1 includes a multi-cylinder engine body 10, an exhaust manifold 14 connected to a right surface 10R of the engine body 10, an unillustrated intake manifold, and a turbocharger 3 disposed adjacent to the right side of the engine body 10. Although illustration is omitted in FIG. 1, the periphery of the exhaust manifold 14 is surrounded by a manifold insulator, the right surface of the engine body 10 is covered with an engine body insulator, and the periphery of the turbocharger 3 is covered with a turbo insulator in order to insulate peripheral components from heat.

The engine body 10 is an in-line 4-cylinder diesel engine. The engine body 10 includes a cylinder block 11, a cylinder head 12 mounted on an upper surface of the cylinder block 11, and a cylinder head cover 13 disposed above the cylinder head 12. The cylinder block 11 includes four cylinders 2 (see FIG. 4, each of which constitutes a fuel combustion chamber.

The exhaust manifold 14 internally includes a manifold passage configured to collect exhaust gas to be discharged from an exhaust port 25 (see FIG. 2) of each cylinder 2 in one flow channel. A portion of the exhaust manifold 14 on the inlet side is connected to the cylinder head 12, and a portion of the exhaust manifold 14 on the outlet side is connected to the turbocharger 3. The unillustrated intake manifold internally includes a manifold passage for supplying intake air to an intake port 24 of each cylinder 2 from one intake passage.

The turbocharger 3 is a device disposed adjacent to a rear right side portion of the engine body 10, and configured to supercharge intake air to be introduced to the engine body 10 by using exhaust energy to be discharged from the engine body 10. The turbocharger 3 includes a large turbo unit 3A (a second turbo unit) configured to supercharge intake air when the engine body 10 is operated in all the speed ranges, and a small turbo unit 3B (a first turbo unit) configured to supercharge intake air when the engine body 10 is mainly operated in a low speed range. In the embodiment, the small turbo unit 3B is continuously extended from the large turbo unit 3A at a position below the large turbo unit 3A. Each of the large turbo unit 3A and the small turbo unit 3B includes a turbine chamber disposed on the front side, and a compressor chamber disposed on the rear side. An exhaust passage through which exhaust air is supplied from the engine body 10 via the turbine chambers, and an intake passage through which intake air to be supplied to the engine body 10 flows via the compressor chambers are formed in the turbocharger 3. In other words, the turbine chambers are disposed in an exhaust path of the engine body 10, and the compressor chambers are disposed in an intake path of the engine body 10.

Internal Configuration of Engine

Figure 2:
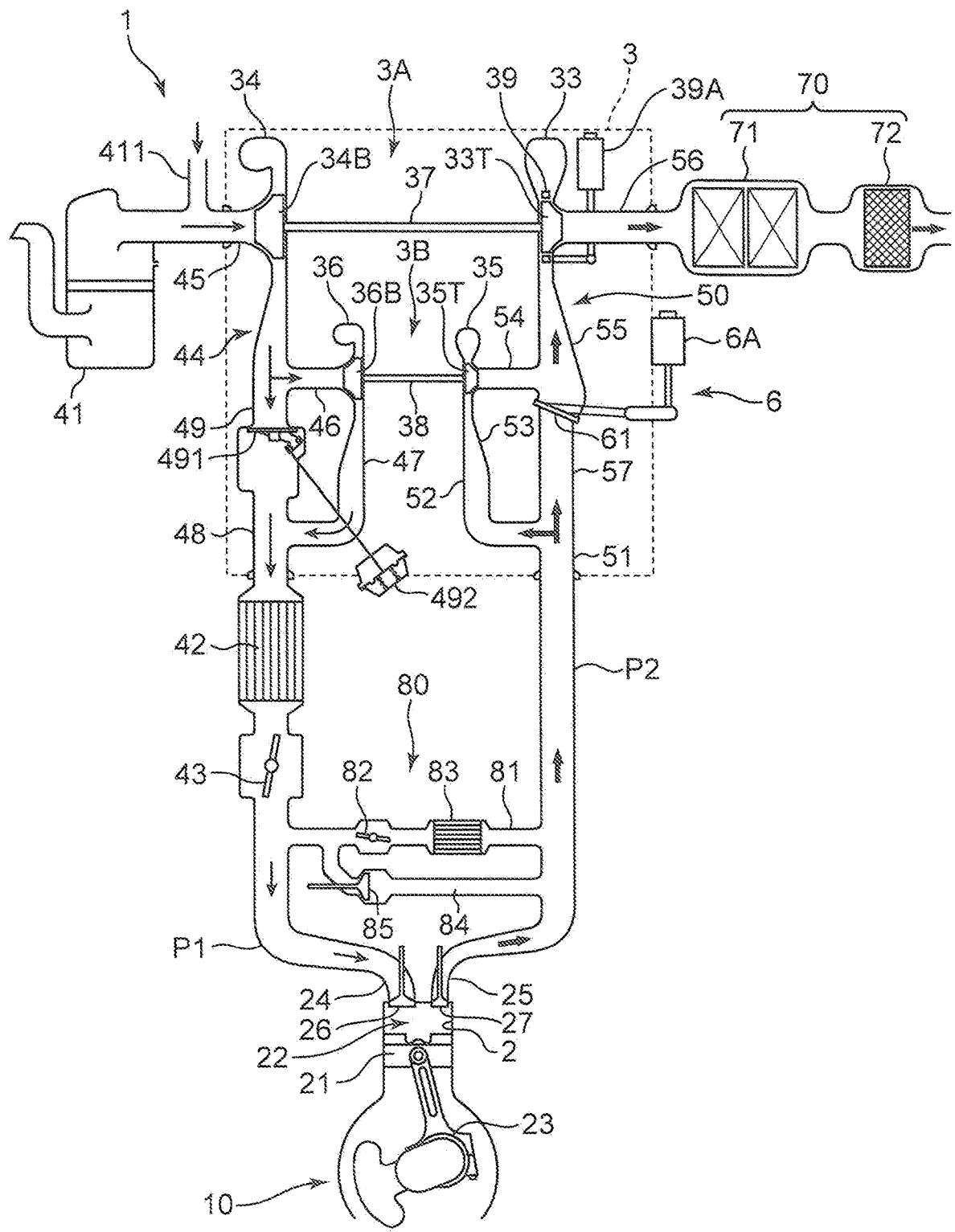
FIG. 2 is a diagram schematically illustrating a configuration of the turbocharger engine and peripheral components thereof, and a flow of intake air and a flow of exhaust air.

FIG. 2 is a diagram schematically illustrating a configuration of the turbocharger engine 1 and peripheral components thereof, and a flow of intake air and a flow of exhaust air. The engine 1 includes the engine body 10, an intake passage P1 for introducing combustion air to the engine body 10, an exhaust passage P2 for discharging combustion gas (exhaust air) generated in the engine body 10, the turbocharger 3 provided with passages constituting a part of the intake passage P1 and a part of the exhaust passage P2, an exhaust purification device 70 disposed near a downstream end of the exhaust passage P2, and an EGR (Exhaust Gas Recirculation) device 80 disposed between the intake passage P1 and the exhaust passage P2.

A piston 21, a combustion chamber 22, a crankshaft 23, the intake port 24, the exhaust port 25, an intake valve 26, and an exhaust valve 27 are provided in each cylinder 2 of the engine body 10. FIG. 2 illustrates one cylinder 2. The piston 21 is accommodated in the cylinder 2 to be reciprocally movable. The combustion chamber 22 is formed above the piston 21 within the cylinder 2. Diesel fuel is injected from an unillustrated injector into the combustion chamber 22. Fuel injected from the injector is mixed with air to be supplied from the intake passage P1, and the fuel-air mixture ignites itself within the combustion chamber 22. The piston 21 is reciprocally moved up and down while being pushed down by an expansion force generated by the combustion.

The crankshaft 23 is an output shaft of the engine body 10, and is disposed below the piston 21. The piston 21 and the crankshaft 23 are connected to each other via a connecting rod. The crankshaft 23 is rotated around an axis thereof in response to reciprocal motion of the piston 21. The intake port 24 is an opening for introducing air (intake air) to be supplied from the intake passage P1 into the cylinder 2. The exhaust port 25 is an opening for discharging exhaust air generated by combustion of fuel within the cylinder 2 to the exhaust passage P2. The intake valve 26 is a valve configured to open and close the intake port 24, and the exhaust valve 27 is a valve configured to open and close the exhaust port 25.

An air cleaner 41, a compressor portion (a large compressor chamber 34 and a small compressor chamber 36) of the turbocharger 3, an intercooler 42, and a throttle valve 43 are provided in this order in the intake passage P1 from the upstream side of a flow of intake air. A downstream end of the intake passage P1 is connected to the intake port 24 via the unillustrated intake manifold. The air cleaner 41 purifies air to be introduced to the intake passage P1. The intercooler 42 cools intake air to be fed to the combustion chamber 22 through the intake port 24. The throttle valve 43 is a valve configured to adjust the amount of intake air to be fed to the combustion chamber 22. Note that a blow-by recirculation passage 411 for feeding blow-by gas to the combustion chamber 22 is connected to an upstream portion of the turbocharger 3 in the intake passage P1. Intake air is supercharged while passing through the compressor portion of the turbocharger 3 to be described later in detail.

An upstream end of the exhaust passage P2 is connected to the exhaust port 25 via the exhaust manifold 14. A turbine portion (a small turbine chamber 35 and a large turbine chamber 33) of the turbocharger 3, and the exhaust purification device 70 are provided in this order in the exhaust passage P2 from the upstream side of a flow of exhaust air. The exhaust purification device 70 is constituted by a catalyst device 71 including an NOx adsorption/reduction catalyst configured to temporarily adsorb NOx in exhaust air, and to reduce thereafter, and a DPF (Diesel Particulate Filter) 72 configured to trap particulate matter within exhaust air. Kinetic energy from exhaust air is recycled when the exhaust air passes through the turbine portion of the turbocharger 3.

The EGR device 80 is a device configured to recirculate a part of exhaust air (EGR gas) discharged from the engine body 10 to intake air. The EGR device 80 includes a first EGR passage 81 and a second EGR passage 84 communicating with the exhaust passage P2 and the intake passage P1 respectively, and a first EGR valve 82 and a second FOR valve 85 configured to open and close the first EGR passage 81 and the second FOR passage 84, respectively. An EGR cooler 83 is provided in the first EGR passage 81. EGR gas is cooled by the EGR cooler 83 while passing through the first EGR passage 81. Thereafter, the cooled EGR gas flows into the intake passage P1. On the other hand, an EGR cooler is not provided in the second EGR passage 84, and EGR gas is allowed to flow into the intake passage P1 while keeping a high-temperature state thereof. The first EGR passage 81 and the second EGR passage 84 communicate between an upstream portion of the exhaust passage P2 with respect to the turbocharger 3, and a downstream portion of the intake passage P1 with respect to the throttle valve 43. According to the aforementioned configuration, exhaust air before being introduced to the turbine portion of the turbocharger 3 is supplied to the intake port 24 together with intake air.

Details of Turbocharger

Next, a detailed structure of the turbocharger 3 according to the embodiment is described with reference to FIG. 2. As described above, the turbocharger 3 includes the large turbo unit 3A for use when the engine is operated in an intermediate speed range to a high speed range, and the small turbo unit 3B for use when the engine is operated in a low speed range. The large turbo unit 3A includes the large turbine chamber 33 (a second turbine chamber) and the large compressor chamber 34 (a second compressor chamber). Likewise, the small turbo unit 3B includes the small turbine chamber 35 (a first turbine chamber) and the small compressor chamber 36 (a first compressor chamber). The large turbine chamber 33 and the small turbine chamber 35 communicate with the exhaust passage P2, and the large compressor chamber 34 and the small compressor chamber 36 communicate with the intake passage P1.

A large turbine 33T (a second turbine) is accommodated in the large turbine chamber 33, and a large compressor 34B (a second compressor) is accommodated in the large compressor chamber 34. The large turbine 33T and the large compressor 34B are connected by a large turbine shaft 37 (a second turbine shaft). The large turbine shaft 37 extends between the large turbine chamber 33 and the large compressor chamber 34. The large turbine 33T is attached to an end of the large turbine shaft 37, and the large compressor 34B is attached to the other end thereof. The large turbine 33T is rotated around an axis of the large turbine shaft 37 by receiving kinetic energy from exhaust air. Likewise, the large compressor 34B is rotated around the axis of the large turbine shaft 37 to compress (supercharge) intake air. When the large turbine 33T is rotated by receiving kinetic energy from exhaust air, the large compressor 34B is also rotated with the large turbine 33T around the axis of the large turbine shaft 37.

As the large turbine 33T, it is possible to use an impeller including a plurality of vanes, and configured to rotate around the axis of the large turbine shaft 37 when exhaust air impinges on the vanes. The large turbine 33T is a so-called VGT (Variable Geometry Turbocharger) turbine, in which a variable vane mechanism 39 capable of changing the flow rate of exhaust air (a turbine capacity) is provided. The variable vane mechanism 39 is disposed on the outer periphery of the large turbine 33T, and includes a plurality of nozzle vanes whose angle is variable. By adjusting the angle of the nozzle vanes, the flow area of exhaust air flowing to the large turbine 33T is changed. Thus, the flow rate of exhaust air is adjusted. The angle of the nozzle vanes is adjusted by a VGT actuator 39A.

A small turbine 35T (a first turbine) is accommodated in the small turbine chamber 35, and a small compressor 36B (a first compressor) is accommodated in the small compressor chamber 36. The small turbine 35T and the small compressor 36B are connected by a small turbine shaft 38 (a first turbine shaft). The small turbine shaft 38 extends between the small turbine chamber 35 and the small compressor chamber 36. The small turbine 35T is attached to an end of the small turbine shaft 38, and the small compressor 36B is attached to the other end thereof. The small turbine 35T is rotated around an axis of the small turbine shaft 38 by receiving kinetic energy from exhaust air. Likewise, the small compressor 36B is rotated around the axis of the small turbine shaft 38 to compress (supercharge) intake air. When the small turbine 35T is rotated by receiving kinetic energy from exhaust air, the small compressor 36B is also rotated with the small turbine 35T around the axis of the small turbine shaft 38. In the embodiment, a so-called FGT (Fixed Geometry Turbocharger) turbine incapable of changing the flow rate of exhaust air flowing to the small turbine 35T is used as the small turbine 35T.

The capacity of the large turbine 33T is set larger than the capacity of the small turbine 35T. Specifically, the large turbine 33T is a turbine whose diameter is larger than the diameter of the small turbine 35T (see FIG. 3). Further, the capacity of the large compressor 34B is set larger than the capacity of the small compressor 36B. According to this configuration, the large turbo unit 3A is operable to rotate the large turbine 33T by exhaust air having a larger flow rate, as compared with the small turbo unit 3B, and is operable to supercharge intake air having a larger flow rate by rotation of the large compressor 34B.

The turbocharger 3 internally includes a supercharger intake passage 44 as a passage forming a part of the intake passage P1. The supercharger intake passage 44 includes an intake inlet passage 45, an intra-compressor passage 46, a downstream passage 47, an outlet passage 48, and an intake bypass passage 49. The intake inlet passage 45 is a most-upstream intake passage within the turbocharger 3, and is a passage extending toward the large compressor 34B in the large compressor chamber 34 in the axis direction of the large turbine shaft 37. The intra-compressor passage 46 is a passage configured to guide intake air from a scroll portion on the outer periphery of the large compressor 34B toward the axis of the small compressor 36B in the small compressor chamber 36.

The downstream passage 47 is a passage extending from a scroll portion on the outer periphery of the small compressor 36B toward the outlet passage 48. The outlet passage 48 is a most-downstream intake passage within the turbocharger 3, and is a passage to be connected to the intercooler 42. In this way, the large compressor 34B is disposed on the upstream side of the small compressor 36B with respect to a flow of intake air.

The intake bypass passage 49 is a passage configured to bypass the small compressor chamber 36, in other words, a passage configured to guide intake air downstream without supplying intake air to the small compressor 36B. Specifically, the intake bypass passage 49 is branched from a midpoint on the intra-compressor passage 46, which is configured to connect between the large compressor chamber 34 and the small compressor chamber 36, and joins the outlet passage 48 together with the downstream passage 47. An intake bypass valve 491 configured to open and close the intake bypass passage 49 is disposed in the intake bypass passage 49.

In a state that the intake bypass valve 491 is fully closed and the intake bypass passage 49 is closed, the total amount of intake air flows into the small compressor chamber 36. On the other hand, in a state that the intake bypass valve 491 is opened, a large amount of intake air bypasses the small compressor chamber 36, and flows downstream through the intake bypass passage 49. Specifically, the small compressor 36B accommodated in the small compressor chamber 36 serves as a resistance against a flow of intake air. Therefore, in a state that the intake bypass valve 491 is opened, a large amount of intake air flows into the intake bypass passage 49 where the resistance is smaller than the intra-compressor passage 46. The intake bypass valve 491 is opened and closed by a valve actuator 492 of a negative pressure type.

The turbocharger 3 internally includes a supercharger exhaust passage 50 as a passage forming a part of the exhaust passage P2. The supercharger exhaust passage 50 includes an exhaust inlet passage 51, a communication passage 52, a small scroll passage 53, an intra-turbo passage 54, a large scroll passage 55, an exhaust passage 56, and an exhaust bypass passage 57. The exhaust inlet passage 51, the communication passage 52, and the small scroll passage 53 are passages formed within the small turbo unit 3B. The large scroll passage 55 and the exhaust passage 56 are passages formed within the large turbo unit 3A. The intra-turbo passage 54 and the exhaust bypass passage 57 are passages spanning between the large turbo unit 3A and the small turbo unit 3B. In the embodiment, the small turbine 35T (specifically, the small turbine chamber 35) is disposed on the upstream side of the large turbine 33T (specifically, the large turbine chamber 33) in the exhaust passage P2.

The exhaust inlet passage 51 is a most-upstream exhaust passage within the turbocharger 3, and is a passage configured to receive exhaust air from the side of the engine body 10. The communication passage 52 is a passage communicating with a downstream portion of the exhaust inlet passage 51, and configured to guide exhaust air toward the small turbine chamber 35. The small scroll passage 53 is a passage forming a part of the small turbine chamber 35, and configured to guide exhaust air toward the small turbine 35T. A downstream end of the communication passage 52 communicates with an upstream portion of the small scroll passage 53. The small scroll passage 53 is a spiral passage disposed in such a manner as to circulate the outer periphery of the small turbine 35T. The small scroll passage 53 is configured such that the channel width thereof is gradually reduced downstream. Exhaust air flows from the small scroll passage 53 radially toward the center of the small turbine 35T to rotate the small turbine 35T around an axis of the small turbine shaft 38.

The intra-turbine passage 54 is a passage communicating between the small turbine 35T and an upstream portion of the large scroll passage 55. An upstream portion of the intra-turbine passage 54 is a portion extending from the small turbine chamber 35 in the axis direction of the small turbine 35T. A downstream portion of the intra-turbine passage 54 is a portion communicating with an upstream portion of the large scroll passage 55. Exhaust air flowing from the outer periphery of the small turbine 35T radially inwardly and subjected to expansion in the small turbine 35T flows out from the intra-turbine passage 54, and is guided to the large turbine 33T.

The large scroll passage 55 is a passage forming a part of the large turbine chamber 33, and configured to guide exhaust air toward the large turbine 33T. The large scroll passage 55 is a spiral passage disposed in such a manner as to circulate the outer periphery of the large turbine 33T. The large scroll passage 55 is configured such that the channel width thereof is gradually reduced downstream. Exhaust air flows from the large scroll passage 55 radially toward the center of the large turbine 33T to rotate the large turbine 33T around an axis of the large turbine shaft 37. The exhaust passage 56 is a most-downstream exhaust passage within the turbocharger 3, and extends from the large turbine chamber 38 in the axis direction of the large turbine 33T. Exhaust air flowing from the outer periphery of the large turbine 33T radially inwardly and subjected to expansion in the large turbine 33T flows out from the exhaust passage 56. A downstream end of the exhaust passage 56 is an opening formed in an unillustrated exhaust flange portion, and is connected to an exhaust passage extending to the exhaust purification device 70 on the downstream side.

The exhaust bypass passage 57 is a passage configured to bypass the small turbine chamber 35, in other words, a passage configured to guide exhaust air downstream (to the large turbine 33) without supplying exhaust air to the small turbine 35T. Specifically, the exhaust bypass passage 57 is branched from a portion where the exhaust inlet passage 51 and the communication passage 52 are merged, and joins an upstream portion of the large scroll passage 55 to bypass the small scroll passage 53 and the intra-turbo passage 54. An exhaust bypass valve 6 configured to open and close the exhaust bypass passage 57 is disposed in the exhaust bypass passage 57. The exhaust bypass valve 6 includes a valve body 61 configured to actually open and close the exhaust bypass passage 57, and a valve actuator 6A configured to activate the valve body 61.

In a state that the exhaust bypass valve 6 (the valve body 61) is fully closed and the exhaust bypass passage 57 is closed, the total amount of exhaust air flows into the small turbine chamber 35. Note that when the EGR device 80 is activated, and recirculation of EGR gas is performed, the total amount of gas obtained by removing the EGR gas from exhaust air discharged from the engine body 10 flows into the small turbine chamber 35. On the other hand, in a state that the exhaust bypass valve 6 is opened, a large amount of exhaust air bypasses the small turbine chamber 35, and flows into the large turbine chamber 33 (the large scroll passage 55) on the downstream side. Specifically, the small turbine 35T accommodated in the small turbine chamber 35 becomes a resistance against a flow of exhaust air. Therefore, in a state that the exhaust bypass valve 6 is opened, a large amount of exhaust air flows into the exhaust bypass passage 57 where the resistance is smaller than the communication passage 52. In other words, exhaust air flows downstream without passing the small turbine 35T.

In other words, exhaust air always passes the large turbine 33T in the large turbine chamber 33, no matter whether or not the exhaust bypass valve 6 is opened or closed. Namely, it is possible to operate the large turbo unit 3A any time to supercharge intake air. This makes it possible to increase a supercharging pressure of intake air by the turbocharger 3, and to enhance energy efficiency of the entirety of an engine system.

Details on Exhaust Passage in Turbocharger

Figure 3:
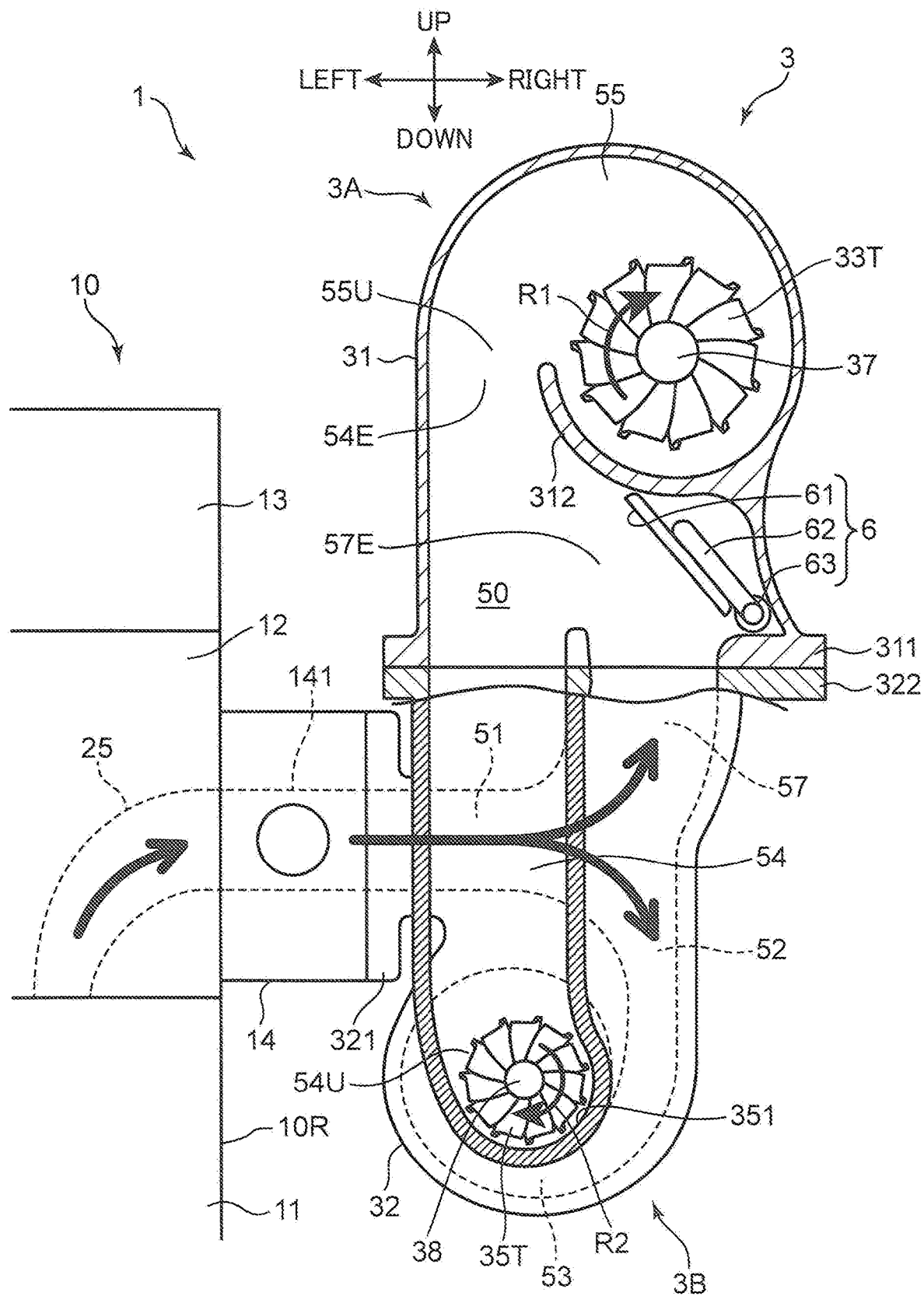
FIG. 3 is a longitudinal sectional side view of a turbocharger when viewed from the side of a turbine.

Next, there are described in detail a specific layout relationship of the supercharger exhaust passage 50, and the shapes of passages in the turbocharger 3, mainly with reference to FIG. 3. FIG. 3 is a longitudinal sectional side view of the turbocharger 3 when viewed from the side of the large turbine 33T and the small turbine 35T (the large turbine chamber 33 and the small turbine chamber 35). FIG.

3 illustrates a large turbine case 31 configured to define the large turbine chamber 33 of the large turbo unit 3A, and a small turbine case 32 configured to define the small turbine chamber 35 of the small turbo unit 3B. The large turbine case 31 is a sheet metal case, for instance, and includes an upper flange portion 311 on a lower end thereof. The small turbine case 32 is a cast iron case, for instance. An inlet flange portion 321 is integrally formed on the upstream side of an exhaust passage, and a lower flange portion 322 is integrally formed on the downstream side of the exhaust passage.

As illustrated in FIG. 3, the engine body 10 is located on the left side of the turbocharger 3 (the large turbo unit 3A) when the turbocharger 3 is viewed from the side of the turbine. The large turbine case 31 is disposed above the small turbine case 32. The large turbine case 31 and the small turbine case 32 are assembled into a unit by placing the upper flange portion 311 on the lower flange portion 322 and by engaging the upper flange portion 311 and the lower flange portion 322 with each other by a bolt. The inlet flange portion 321 is a flange portion configured to connect between the small turbine case 32 and the exhaust manifold 14, and is a portion as an exhaust inlet to the turbocharger 3. An upstream portion of a manifold passage 141 of the exhaust manifold 14 is connected to the cylinder head 12 in alignment with an outlet opening of the exhaust port 25. A downstream portion of the manifold passage 141 is connected to the inlet flange portion 321.

The exhaust inlet passage 51 on the most upstream side of the supercharger exhaust passage 50 is a passage including an opening, in an end surface of the inlet flange portion 321, and extending rightwardly. The exhaust inlet passage 51 is disposed between the large turbo unit 3A and the small turbo unit 3B. The exhaust port 25 and the exhaust inlet passage 51 (the supercharger exhaust passage 50) communicate with each other via the manifold passage 141 of the exhaust manifold 14. According to this configuration, it is possible to draw exhaust air from the side of the engine body 10 into the turbocharger 3.

A downstream portion of the exhaust inlet passage 51 is a branch passage formed by branching an exhaust passage into a Y-shape constituted by an upper portion and a lower portion. An upstream end of the communication passage 52 communicates with the lower portion of the branch passage. The communication passage 52 extends downwardly. A downstream end of the communication passage 52 communicates with an upstream end of the small scroll passage 53. The small scroll passage 53 is a passage scrolling clockwise from upstream toward downstream. According to this configuration, as indicated by the arrow R2 in FIG. 3, the small turbine 35T is also rotated clockwise around an axis of the small turbine shaft 38.

In a side view of FIG. 3, the intra-turbine passage 54 substantially linearly extends in an up-down direction to intersect the exhaust inlet passage 51. An upstream end 54U of the intra-turbine passage 54 is axially aligned with the small turbine shaft 38. A downstream end 54E of the intra-turbine passage 54 communicates with a scroll inlet portion 55U of the large scroll passage 55. Specifically, the intra-turbine passage 54 is a passage spanning between the small turbine case 32 and the large turbine case 31. The large scroll passage 55 is a passage scrolling clockwise from upstream toward downstream. According to this configuration, as indicated by the arrow R1 in FIG. 3, the large turbine 33T is also rotated clockwise around an axis of the large turbine shaft 37. Note that the exhaust passage 56 axially aligned with the large turbine shaft 37 is not illustrated in FIG. 3.

The exhaust bypass passage 57 communicates with the upper portion of the branch passage, and extends upwardly toward the scroll inlet portion 55U of the large scroll passage 55. The exhaust bypass passage 57 is also a passage spanning between the small turbine case 32 and the large turbine case 31. In a side view of FIG. 3, the exhaust bypass passage 57 is disposed on the right side of the intra-turbine passage 54. In other words, in the side view, the intra-turbine passage 54 and the exhaust bypass passage 57 extending in an up-down direction are disposed substantially in parallel to each other in a left-right direction. A downstream end 57E of the exhaust bypass passage 57 joins a downstream portion of the intra-turbine passage 54. In other words, the exhaust bypass passage 57 joins the intra-turbine passage 54 in the vicinity of an upstream portion of the scroll inlet portion 55U of the large scroll passage 55.

An exhaust bypass valve 6 disposed in the exhaust bypass passage 57 includes a valve body 61, a holding piece 62, and a pivot shaft 63. As described above, the valve body 61 is configured to open and close the exhaust bypass passage 57, and has a shape capable of closing the exhaust bypass passage 57. In other words, the valve body 61 has a size larger than the size of an opening of the downstream end of the exhaust bypass passage 57. The holding piece 62 is a rectangular member disposed on a back surface of the valve body 61, and holds the valve body 61 at an end thereof.

The pivot shaft 63 extends in a direction (in a front-rear direction) substantially parallel to the large turbine shaft 37, and is connected to the other end of the holding piece 62. The pivot shaft 63 supports the valve body 61 via the holding piece 62 in a cantilever state. According to this configuration, when the pivot shaft 63 is pivotally moved around an axis thereof, the valve body 61 is also pivotally moved around the axis of the pivot shaft 63. The pivot shaft 63 is pivotally movable around the axis thereof by the valve actuator 6A. When the valve actuator 6A pivotally moves the pivot shaft 63 around the axis thereof, the valve body 61 changes its posture between a posture (see FIG. 6) in which the exhaust bypass passage 57 is closed, and a posture (see FIG. 7) in which the exhaust bypass passage 57 is opened.

Layout on Turbine Shafts and Intra-turbine Passage

Figure 4:
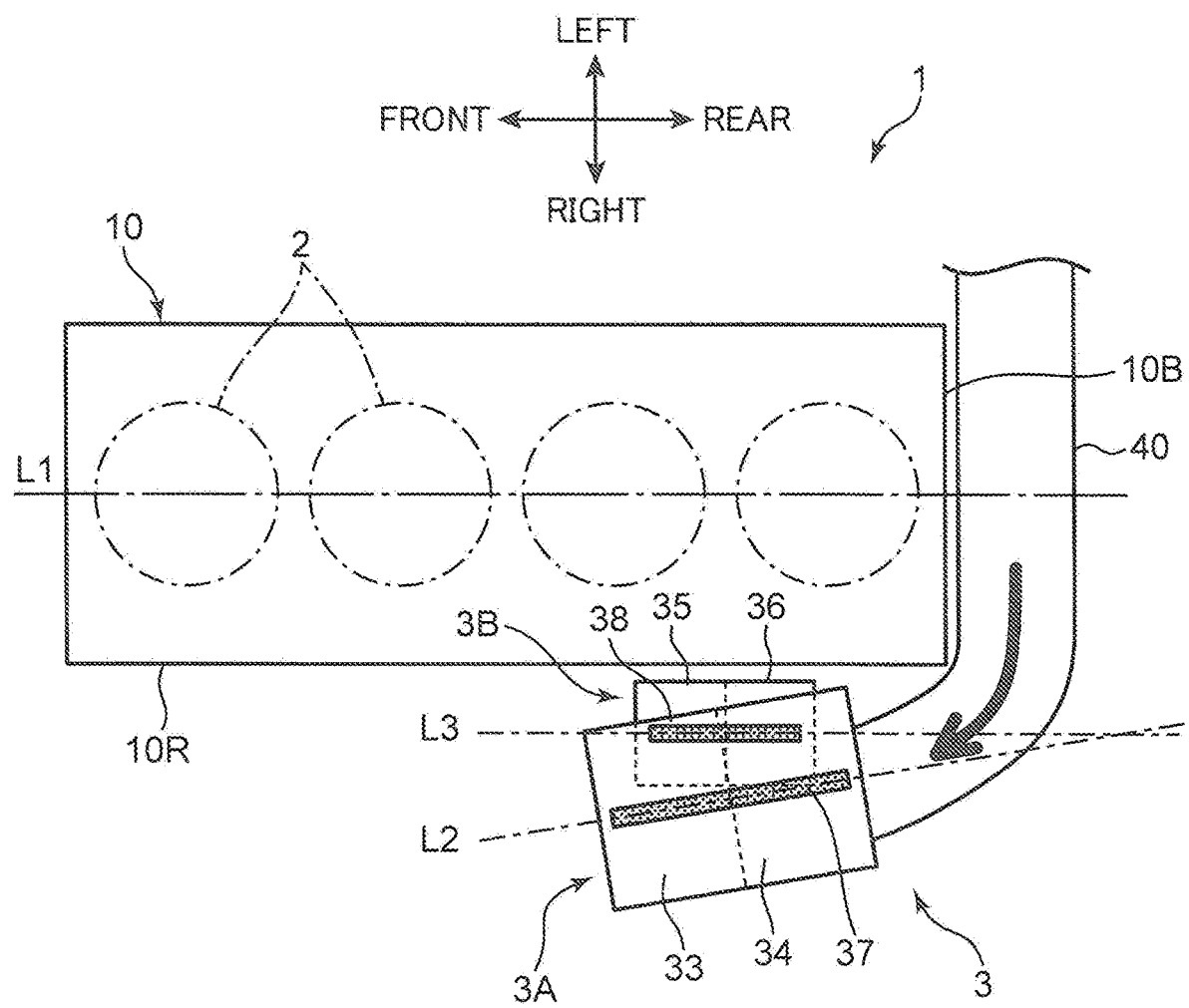
FIG. 4 is a top plan view of the engine.
Figure 5:
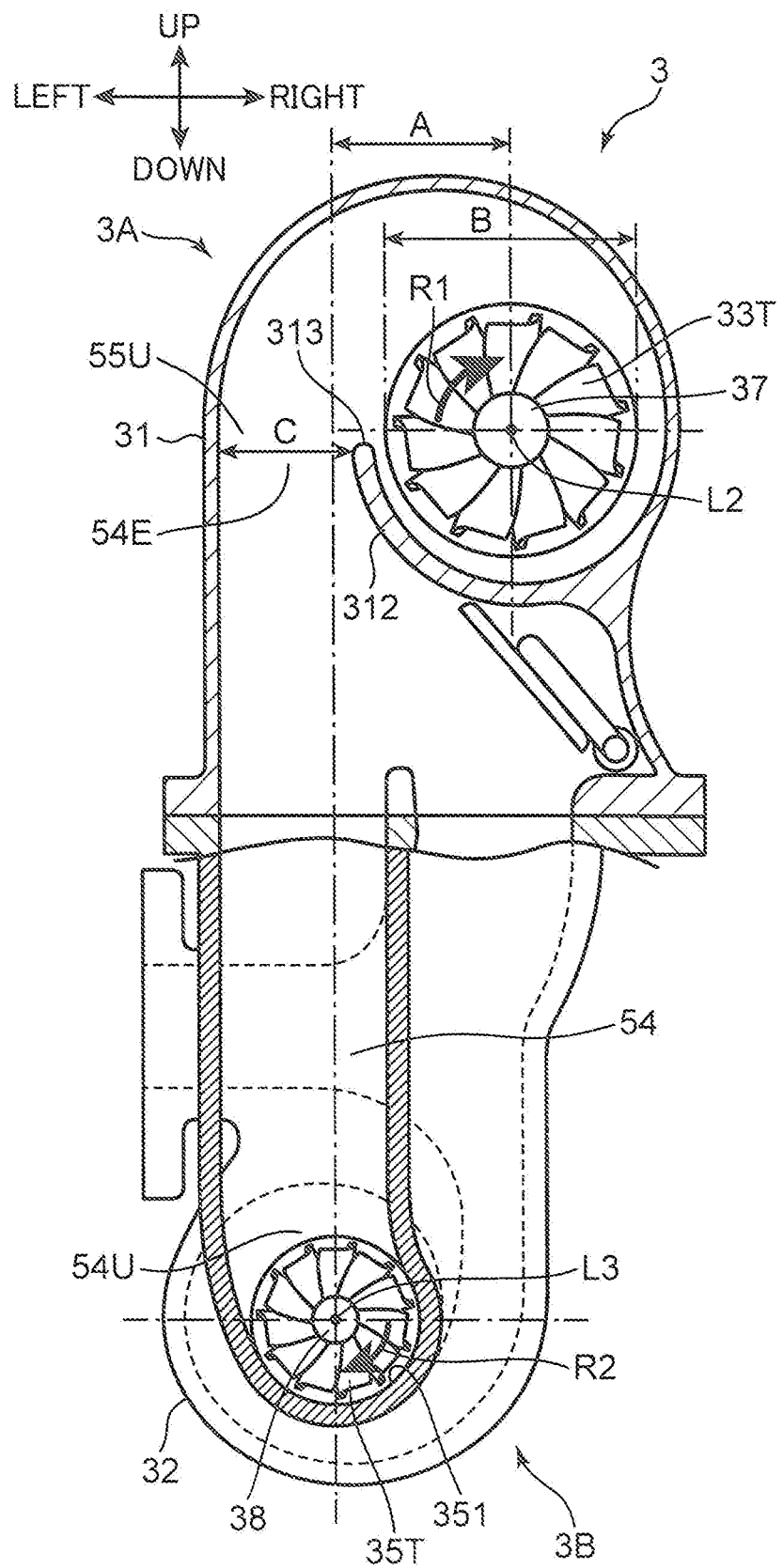
FIG. 5 is a sectional view for describing a distance between turbo axes of the turbocharger.

Next, a layout on the large turbine shaft 37, the small turbine shaft 38, and the intra-turbine passage 54 is described with reference to FIG. 4 and FIG. 5. FIG. 4 is a schematic top plan view of the turbocharger engine 1. FIG. 5 is a longitudinal sectional side view of the turbocharger 3 when the turbocharger 3 is viewed from the side of the large turbine 33T and the small turbine 35T (the large turbine chamber 33 and the small turbine chamber 35), as well as FIG. 3.

As illustrated in FIG. 4, an intake inlet pipe 40 is connected to the large turbo unit 3A of the turbocharger 3. The intake inlet pipe 40 is a pipe member configured to connect between the air cleaner 41 (see FIG. 2), and an intake inlet port formed in a rear end of the large turbo unit 3A. As indicated by the arrow in FIG. 4, intake air purified by the air cleaner 41 is supplied to the large compressor chamber 34 of the large turbo unit 3A through the intake inlet pipe 40.

The array direction of the four cylinders 2, which are arranged in series in the engine body 10, is aligned with a front-rear direction of the engine body 10. An engine output shaft (the crankshaft 23) also extends in a front-rear direction. FIG. 4 illustrates a straight line L1 (hereinafter, referred to as an engine output axis L1) corresponding to the extending direction of the engine output shaft. The engine body 10 has a generally rectangular shape in a top plan view with a long length in a front-rear direction. The turbocharger 3 is disposed adjacent to the right surface 10R of the engine body 10, and in the vicinity of a rear surface 10B.

FIG. 4 schematically illustrates the large turbine chamber 33, the large compressor chamber 34, and the large turbine shaft 37 extending between the large turbine chamber 33 and the large compressor chamber 34 of the large turbo unit 3A; and the small turbine chamber 35, the small compressor chamber 36, and the small turbine shaft 38 extending between the small turbine chamber 35 and the small compressor chamber 36 of the small turbo unit 3B. Further, FIG. 4 illustrates a straight line L2 (hereinafter, referred to as a large turbo axis L2) corresponding to an axis of the large turbine shaft 37, and a straight line L3 (hereinafter, referred to as a small turbo axis L3) corresponding to an axis of the small turbine shaft 38. The large turbo axis L2 and the small turbo axis L3 are disposed to extend generally in a front-rear direction as well as the engine output axis L1.

The embodiment describes an example, in which the small turbo axis L3 is substantially parallel to the engine output axis L1, and the large turbo axis L2 is non-parallel to the engine output axis L1 in a plan view in the axis direction of the cylinder 2 (see the one-dotted chain line S in FIG. 1). In other words, the large turbo unit 3A and the small turbo unit 3B are disposed with respect to the engine body 10 in such a manner that the large turbo axis L2 is inclined with respect to the small turbo axis L3 with a predetermined angle of inclination. The inclination of the large turbo axis L2 is an inclination such that a portion of the large turbo axis L2 on the side of the large compressor chamber 34 is close to the engine output axis L1. In view of the above, the large turbo axis L2 and the small turbo axis L3 intersect with each other on the side of the large compressor chamber 34 and the small compressor chamber 36. Conversely, a distance between the large turbo axis L2 and the small turbo axis L3 in a left-right direction increases in the large turbine chamber 33 and the small turbine chamber 35. Alternatively, the large turbo axis L2 and the small turbo axis L3 may intersect with each other on the side of the large compressor chamber 34 and the small compressor chamber 36, as far as the large turbo axis L2 lies in an actual range as an axis of the large turbine shaft 37 and the small turbo axis L3 lies in an actual range as an axis of the small turbine shaft 38.

Regarding a positional relationship between the large turbine shaft 37, the small turbine shaft 38, and the engine output axis L1, the large turbine shaft 37 is disposed far from the engine output axis L1, as compared with the small turbine shaft 38 in a plan view in the axis direction of the cylinder 2. In other words, with reference to FIG. 3, the small turbine shaft 38 is disposed close to the right surface 10R of the engine body 10, and the large turbine shaft 37 is disposed on the right side of the small turbine shaft 38.

The large turbine shaft 37 is rotated clockwise (in the direction of the arrow R1 in FIG. 5) around an axis thereof in a side view of FIG. 5. This means that the scroll direction of the large scroll passage 55 from upstream toward downstream also coincides with a clockwise direction. The scroll inlet portion 55U of the large scroll passage 55 (an entrance of a second turbine chamber) is opened downwardly on the left side of the large turbine shaft 37. On the other hand, an outlet portion 351 of the small turbine chamber 35 (an exit of a first turbine chamber) is disposed axially in alignment with the small turbo axis L3. The scroll inlet portion 55U and the outlet portion 351 have a positional relationship such that the scroll inlet portion 55U and the outlet portion 351 are linearly aligned substantially in an up-down direction, taking into consideration that the large turbo axis L2 is located on the right side with respect to the small turbo axis L3.

The intra-turbine passage 54 is an exhaust passage extending from the outlet portion 351 of the small turbine chamber 35 to the scroll inlet portion 55U of the large scroll passage 55. A main portion of the intra-turbine passage 54 extending downwardly (toward upstream) from the downstream end 54E is a straight portion extending linearly downwardly in the side view. On the other hand, a portion of the intra-turbine passage 54 in the vicinity of the upstream end 54U is curved in a three-dimensional manner so as to change the direction of an intake passage from the straight portion to a horizontal direction along which the small turbo axis L3 extends. The straight portion is a linear passage extending generally vertically in the side view, as far as the engine 1 is not mounted in a slant state.

The intra-turbine passage 54 having the aforementioned configuration is disposed on the side of the engine body 10 than the large turbine shaft 37 in a side view of FIG. 5. In other words, the intra-turbine passage 54 is disposed between the right surface 10R of the engine body 10 and the large turbine shaft 37 in a left-right direction, and linearly connects between the small turbine case 32 (the small turbine chamber 35) and the large turbine case 31 (the large turbine chamber 33).

Next, there is described a preferable distance between axes i.e. between the large turbo axis L2 as an axis of the large turbine shaft 37, and the small turbo axis L3 as an axis of the small turbine shaft 38 in a left-right direction in a side view of FIG. 5. FIG. 5 illustrates the large turbo axis L2 and the small turbo axis L3 in a side view i.e. in the same direction as FIG. 3. Further, it is assumed that A is a distance between the large turbo axis L2 and the small turbo axis L3, B is an outer diameter of the large turbine 33T (a second turbine), and C is a diameter of the scroll inlet portion 55U of the large scroll passage 55 (an inlet portion of a scroll passage). The scroll inlet portion 55U is a substantially circular opening in section which is formed between a distal end portion 313 of a tongue portion 312 configured to define the periphery of a downstream end of the large scroll passage 55, and an inner left wall surface of the large turbine case 31. It is preferable to set the distance A between the large turbo axis L2 and the small turbo axis L3 to a range expressed by the following formula (1) in order to attain miniaturization of the turbocharger 3, and to secure linearity of the intra-turbine passage 54, and taking into consideration a relationship with respect to the outer diameter B of the large turbine 33T:

$$B/2 \leq A \leq B \qquad (1)$$

When the distance A between axes is smaller than B/2, it is necessary to considerably curve the intra-turbine passage 54 rightwardly in a range from the downstream end 54E to the upstream end 54U. This may tend to increase an exhaust resistance in the intra-turbine passage 54. Further, when the distance A between axes is larger than B, it is necessary to considerably curve the intra-turbine passage 54 leftwardly. This may also tend to increase an exhaust resistance.

Further, it is preferable to set the distance A between the large turbo axis L2 and the small turbo axis L3 in a range expressed by the following formula (2) for the same reason as described above, and taking into consideration a relationship with respect to the outer diameter B of the large turbine 33T and the diameter C of the scroll inlet portion 55U:

$$B/2 \leq A \leq B/2 + C \quad (2)$$

When the distance A between axes is smaller than B/2, it is necessary to considerably curve the intra-turbine passage 54 rightwardly in a range from the downstream end 54E to the upstream end 54U as described above. This may tend to increase an exhaust resistance. Further, when the distance A between axes is larger than B/2+C, it is necessary to considerably curve the intra-turbine passage 54 leftwardly. This may also tend to increase an exhaust resistance.

Description on Flow of Exhaust Air

Figure 6:
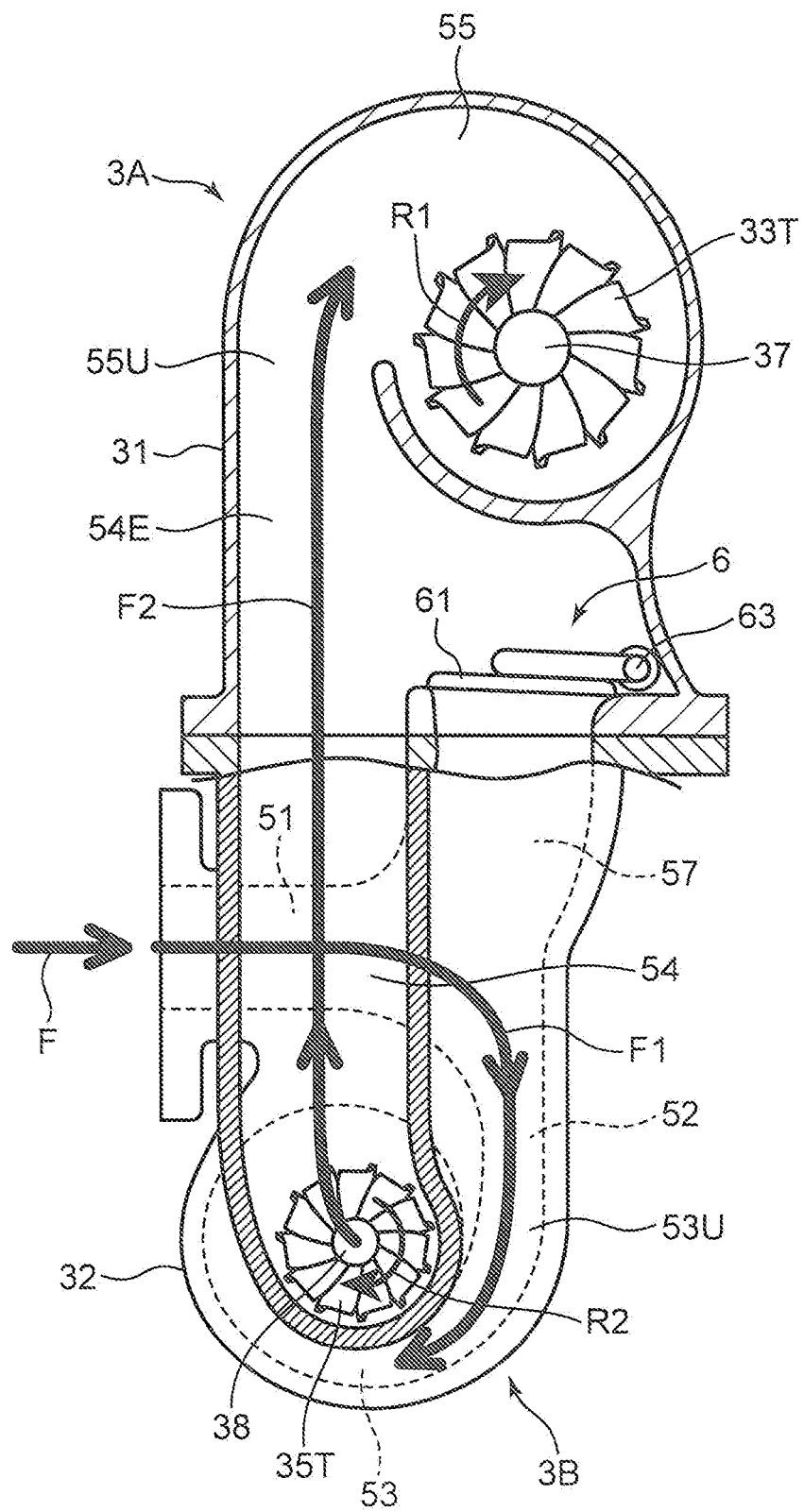
FIG. 6 is a side view of the turbocharger illustrating a flow of exhaust air in the turbocharger in a low speed range of an engine body.

Next, a flow of exhaust air in the turbocharger 3 is described with reference to FIG. 6 and FIG. 7. FIG. 6 is a sectional view illustrating a flow of exhaust air in the turbocharger 3 in a low speed range of the engine body 10. In a low speed range, the valve actuator 6A sets the valve body 61 to a closed state to close the exhaust bypass passage 57. In this case, exhaust air (see the arrow F) discharged from the side of the engine body 10 enters the exhaust inlet passage 51 of the small turbine case 32. Exhaust air is guided downwardly by the communication passage 52, and reaches an upstream portion 53U of the small scroll passage 53 (see the arrow F1). Further, exhaust air flows over the entirety of the outer periphery of the small turbine 35T from the small scroll passage 53 on the outer periphery of the small turbine 35T, and is deflected in a direction toward the small turbine shaft 38 so as to act on the small turbine 35T, whereby the small turbine 35T is rotated clockwise indicated by the arrow R2.

Thereafter, exhaust air is drawn out axially of the small turbine 35T, and enters the intra-turbine passage 54. Then, exhaust air is guided upwardly along the intra-turbine passage 54, and reaches the scroll inlet portion 55U of the large scroll passage 55 via the downstream end 54E (see the arrow F2)). In this case, exhaust air also flows into the large turbine case 31 from the small turbine case 32. Then, exhaust air flows over the entirety of the outer periphery of the large turbine 33T from the large scroll passage 55 on the outer periphery of the large turbine 33T, and is deflected in a direction toward the large turbine shaft 37 so as to act on the large turbine 33T, whereby the large turbine 33T is rotated clockwise indicated by the arrow R1. Thereafter, exhaust air is drawn out axially of the large turbine 33T, is discharged to the outside of the turbocharger 3 through the exhaust passage 56 (see FIG. 2), and is guided to the exhaust purification device 70.

Figure 7:
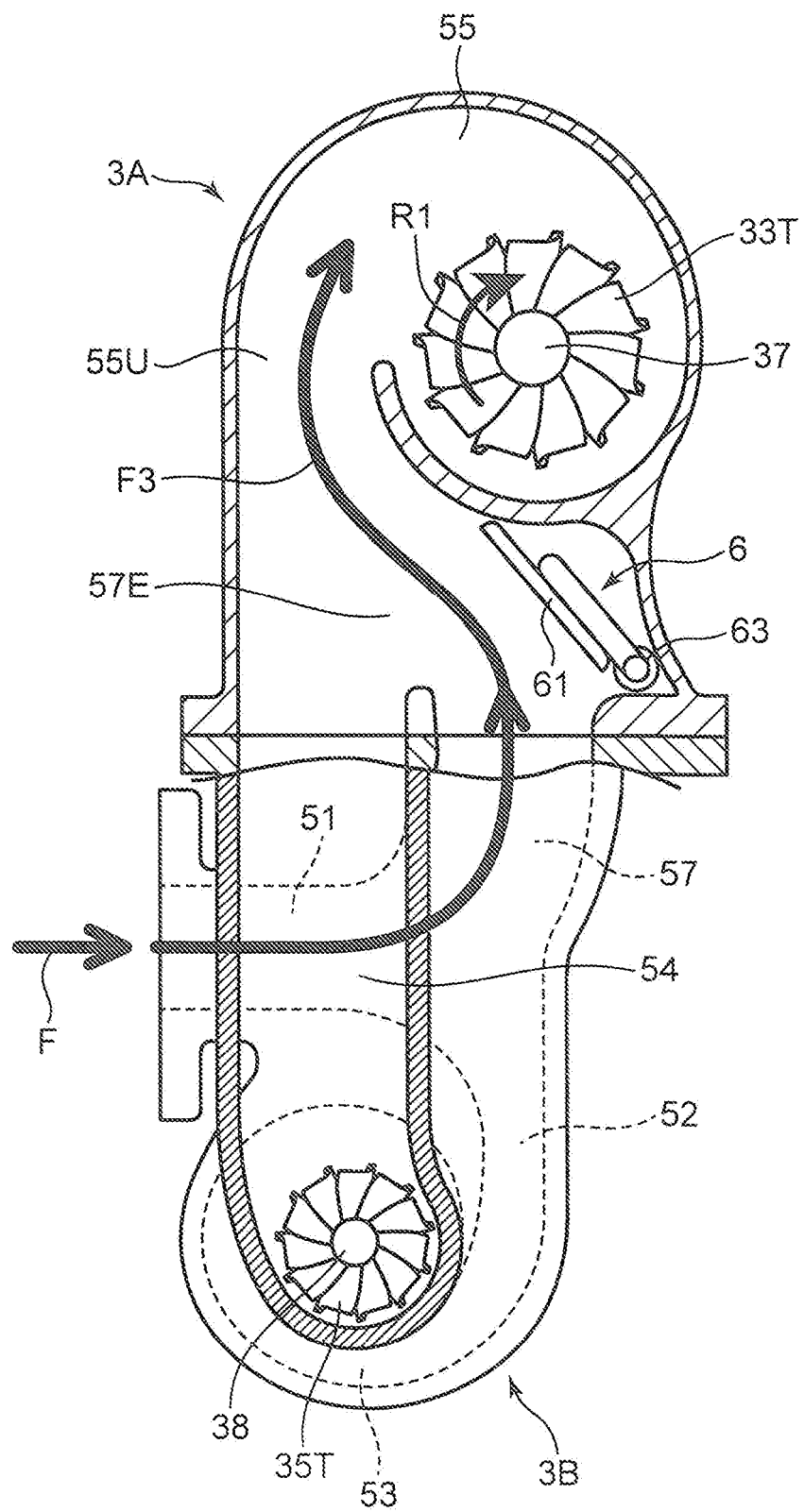
FIG. 7 is a side view of the turbocharger illustrating a flow of exhaust air in the turbocharger in an intermediate speed range to a high speed range of the engine body.

FIG. 7 is a sectional view of a flow of exhaust air in the turbocharger 3 in an intermediate speed range to a high speed range of the engine body 10. In an intermediate speed range to a high speed range, the valve actuator 6A sets the valve body 61 to an opened state to open the exhaust bypass passage 57. In this case, exhaust air (see the arrow F) to be discharged from the side of the engine body 10 mainly flows into the exhaust bypass passage 57 whose flow resistance is small via the exhaust inlet passage 51. Then, exhaust air is guided upwardly and leftwardly along the exhaust bypass passage 57, and flows into the scroll inlet portion 55U of the large scroll passage 55 from a direction slightly on the right side (see the arrow F3). In this case, exhaust air also flows into the large turbine case 31 from the small turbine case 32. Thereafter, exhaust air flows into the large turbine 33T from the large scroll passage 55, is drawn out axially of the large turbine 33T, and is guided to the exhaust passage 56 in the same manner as described above.

Advantageous Effects

The turbocharger engine 1 according to the embodiment as described above provides the following advantageous effects. The turbocharger engine 1 includes the dual stage turbocharger 3 in which the small turbo unit 3B is disposed in series with the large turbo unit 3A on the upstream side of the large turbo unit 3A in the supercharger exhaust passage 50. The turbocharger 3 is disposed in such a manner that the large turbine shaft 37 (a second turbine shaft) is far from the crankshaft 23 (the engine output axis L1) of the engine body 10 than the small turbine shaft 38 (a first turbine shaft) in a plan view in the axis direction of the cylinder 2. Therefore, the large turbine shaft 37 (the large turbo axis L2) is located on the right side with respect to an axis passing through the small turbine shaft 38 (the small turbo axis L3) and extending in the axis direction of the cylinder 2 (see FIG. 3 and FIG. 5).

Further, the large turbine shaft 37 is rotated clockwise around an axis thereof, and the intra-turbine passage 54 is disposed on the side of the engine body 10 than the large turbine shaft 37 in a side view when the turbocharger 3 is viewed from the side of the large turbine 33T and the small turbine 35T. According to this configuration, it is possible to form the intra-turbine passage 54 as a passage of a short length and a small curvature by using a feature that the large turbine shaft 37 is located on the right side. This makes it possible to reduce a resistance against a flow of exhaust air in the intra-turbine passage 54, and to efficiently give kinetic energy from exhaust air to the large turbine 33T. This is advantageous in enhancing supercharging efficiency.

Further, the large turbo unit 3A and the small turbo unit 3B are disposed with respect to the engine body 10 in such a manner that the large turbo axis L2 and the small turbo axis L3 intersect with each other on the side of the large compressor chamber 34 and the small compressor chamber 36. Therefore, the distance between the axis of the large turbine shaft 37 and the axis of the small turbine shaft 38 increases on the side of the large turbine chamber 33 and the small turbine chamber 35. This makes it possible to attain a layout, in which the large turbine shaft 37 is disposed far from the engine output axis L1 than the small turbine shaft 38 by a predetermined distance without setting the large turbo unit 3A and the small turbo unit 3B away from each other in a left-right direction. This contributes to miniaturization of the turbocharger 3 in a left-right direction.

Further, the distance A between the axis of the large turbine shaft 37 and the axis of the small turbine shaft 38 (between the large turbo axis L2 and the small turbo axis L3) in a left-right direction in a side view when the turbocharger 3 is viewed from the side of the large turbine 33T and the small turbine 35T is set in the range defined by the formula (1) or the formula (2). This avoids forming the outlet portion 351 of the small turbine chamber 35 at a position away from the large turbine shaft 37 in a left-right direction. Therefore, it is possible to form the intra-turbine passage 54 as a passage of a small curvature in the side view.

The turbocharger 3 is a dual stage turbocharger in which the small turbine chamber 35 is disposed on the upstream side of the large turbine chamber 33 in the exhaust passage P2, and the large turbine 33T is a turbine whose diameter is larger than the diameter of the small turbine 35T. This allows the large turbo unit 3A to rotate the large turbine 33T by exhaust air having a larger flow rate, as compared with the small turbo unit 3B, and to supercharge intake air having a larger flow rate by rotation of the large compressor 34B. According to the aforementioned configuration, an exhaust resistance of the intra-turbine passage 54 is small. Therefore, it is possible to efficiently rotate the large turbine 33T in a low speed range of the engine body 10.

Further, the turbocharger 3 includes the exhaust bypass passage 57 configured to bypass the small turbine chamber 35, and to guide exhaust air to be supplied from the engine body 10 to the large turbine chamber 33. The exhaust bypass passage 57 is disposed on the right side of the intra-turbine passage 54 in a side view when the turbocharger 3 is viewed from the side of the large turbine 33T and the small turbine 35T. This makes it possible to implement an operation of supercharging intake air only by the large turbo unit 3A. Further, it is possible to form the exhaust bypass passage 57 as a compact passage by using a right region of the intra-turbine passage 54. Furthermore, the downstream end 57E of the exhaust bypass passage 57 joins a portion in the vicinity of the downstream end 54E of the intra-turbine passage 54. This is further advantageous in miniaturizing the turbocharger 3.

As described above, according to the present invention, in the engine 1 provided with the dual stage turbocharger 3 including the large turbo unit 3A and the small turbo unit 3B, it is possible to reduce a resistance against a flow of exhaust air in the intra-turbine passage 54 of the turbocharger 3. This makes it possible to provide a turbocharger engine, which enables to improve supercharging efficiency of the turbocharger 3 by giving large kinetic energy from exhaust air to turbines, and to miniaturize the turbocharger 3.

Description of Modifications

In the foregoing, an embodiment of the present invention is described. The present invention, however, is not limited to the above. For instance, FIG. 4 illustrates an example, in which the large turbo axis L2 and the small turbo axis L3 are disposed non-parallel to each other, and the large turbo axis L2 and the small turbo axis L3 intersect with each other on the side of the large compressor chamber 34 and the small compressor chamber 36. Alternatively, the large turbo axis L2 and the small turbo axis L3 may be disposed parallel to each other, and may also be disposed parallel to the engine output axis L1.

FIG. 8 is a top plan view illustrating a layout of a turbocharger 30 as a modification of the embodiment. In the turbocharger 30, a large turbo axis L20 corresponding to an axis of a large turbine shaft 37 of a large turbo unit 3A, and a small turbo axis L30 corresponding to an axis of a small turbine shaft 38 of a small turbo unit 3B are parallel to each other, and are also parallel to an engine output axis L1 in a plan view in the axis direction of a cylinder 2. The large turbo unit 3A and the small turbo unit 3B may be mounted on an engine body 10 in such a manner that the large turbo axis L20 and the small turbo axis L30 have the aforementioned layout.

In addition to the above, regarding a rotational direction of the small turbine shaft 38, FIG. 3 illustrates an example, in which the small turbine shaft 38 is rotated clockwise as well as the large turbine shaft 37. Alternatively, the small turbine shaft 38 may be rotated counterclockwise, which is opposite to the rotational direction of the large turbine shaft 37. Further, the embodiment describes an example, in which the turbocharger 3 is a dual stage turbocharger including the large turbo unit 3A and the small turbo unit 3B. Alternatively, the turbocharger may be a dual stage turbocharger in which two turbo units have the same supercharging performance.

The aforementioned embodiment discloses a turbocharger engine having the following configuration.

A turbocharger engine according to an aspect of the present invention includes an engine body provided with a cylinder and an engine output shaft; and a turbocharger disposed adjacent to the engine body, and including an exhaust passage through which exhaust air is supplied from the engine body, and an intake passage through which intake air is supplied to the engine body to supercharge the intake air. The turbocharger includes a first turbo unit provided with a first turbine chamber communicating with the exhaust passage and configured to accommodate a first turbine, a first compressor chamber communicating with the intake passage and configured to accommodate a first compressor, and a first turbine shaft extending between the first turbine chamber and the first compressor chamber to connect between the first turbine and the first compressor; and a second turbo unit provided with a second turbine chamber communicating with the exhaust passage and configured to accommodate a second turbine, a second compressor chamber communicating with the intake passage and configured to accommodate a second compressor, and a second turbine shaft extending between the second turbine chamber and the second compressor chamber to connect between the second turbine and the second compressor. The first turbine chamber is disposed on an upstream side of the second turbine chamber in the exhaust passage. The first turbine shaft and the second turbine shaft are disposed to extend generally in a same direction as the engine output shaft. The second turbo unit is disposed with respect to the engine body in such a manner that the second turbine shaft is far from the engine output shaft than the first turbine shaft in a plan view in an axis direction of the cylinder. In a side view when the first turbine shaft and the second turbine shaft are viewed from a side of the first turbine chamber and the second turbine chamber, the engine body is located on a left side of the second turbo unit, the second turbine shaft is rotated clockwise around an axis thereof, and an intra-turbine passage from an exit of the first turbine chamber to an entrance of the second turbine chamber is disposed on a side of the engine body than the second turbine shaft.

In the turbocharger engine having the aforementioned configuration, the second turbine shaft is disposed far from the engine output shaft than the first turbine shaft in the plan view. Therefore, the second turbine shaft is located on the right side with respect to an axis passing through the first turbine shaft and extending in the axis direction of the cylinder. Further, the second turbine shaft is rotated clockwise around an axis thereof in the side view, and the intra-turbine passage is disposed on the side of the engine body than the second turbine shaft. Therefore, it is possible to form the intra-turbine passage as a passage of a short length and a small curvature by using a feature that the second turbine shaft is located on the right side. This makes it possible to reduce a resistance against a flow of exhaust air in the intra-turbine passage, and to efficiently give kinetic energy from exhaust air to the second turbine. This is advantageous in enhancing supercharging efficiency.

Note that the expression, in this specification, "the large turbo axis and the small turbo axis are exposed to extend in the same direction as the engine output axis" means not only precise "the same direction", but also generally "the same direction". For example, even if the large turbo axis and/or the small turbo axis include an inclination with respect to the engine output axis by about 10 to 20 degrees, it is in a category of "the same direction".

In the turbocharger engine having the aforementioned configuration, preferably, the first turbo unit and the second turbo unit may be disposed with respect to the engine body in such a manner that the first turbine shaft and the second turbine shaft, or a first turbo axis as an axis of the first turbine shaft and a second turbo axis as an axis of the second turbine shaft intersect with each other on a side of the first compressor chamber and the second compressor chamber.

In the turbocharger engine having the aforementioned configuration, the distance between the axis of the first turbine shaft and the axis of the second turbine shaft increases on the side of the first turbine chamber and the second turbine chamber. This makes it possible to attain a layout, in which the second turbine shaft is far from the engine output shaft than the first turbine shaft by a predetermined distance without setting the first turbo unit and the second turbo unit away from each other in a left-right direction. This contributes to miniaturization of the turbocharger in a left-right direction.

In the turbocharger engine having the aforementioned configuration, preferably, when it is assumed that A is a distance between an axis of the first turbine shaft and an axis of the second turbine shaft in a left-right direction, and B is an outer diameter of the second turbine in the side view, the distance A may be set in a range defined by the following formula:

$$B/2 \leq A \leq B.$$

In the aforementioned configuration, preferably, the second turbine chamber may include a scroll passage formed in a periphery of the second turbine, and when it is assumed that A is a distance between an axis of the first turbine shaft and an axis of the second turbine shaft in a left-right direction, B is an outer diameter of the second turbine, and C is a diameter of an inlet portion of the scroll passage in the side view, the distance A may be set in a range defined by the following formula:

$$B/2 \leq A \leq B/2 + C.$$

In the turbocharger engine having the aforementioned configuration, the distance A between an axis of the first turbine shaft and an axis of the second turbine shaft in a left-right direction is set in the range as defined by one of the aforementioned formulae. This avoids forming the exit of the first turbine chamber at a position away from the second turbine shaft in a left-right direction. Therefore, it is possible to form the intra-turbine passage as a passage of a small curvature in the side view.

In the turbocharger engine having the aforementioned configuration, preferably, the second turbine may be a turbine whose diameter is larger than a diameter of the first turbine.

In the turbocharger engine having the aforementioned configuration, for instance, it is possible to configure an engine provided with a dual stage turbocharger, in which a first turbo unit is a large turbo unit configured to be mainly operated in an intermediate speed range to a high speed range of an engine body, and a second turbo unit is a small turbo unit configured to be mainly operated in a low speed range of the engine body, for instance.

Preferably, the turbocharger engine having the aforementioned configuration may further include a bypass passage disposed on a right side of the intra-turbine passage in the side view, and configured to bypass the first turbine chamber so as to guide exhaust air to be supplied from the engine body to the second turbine chamber.

In the turbocharger engine having the aforementioned configuration, it is possible to implement an operation of supercharging intake air only by the second turbo unit. Further, it is possible to form a bypass passage as a compact passage by using a right region of the intra-turbine passage.

In the aforementioned configuration, forming a downstream end of the bypass passage to join the intra-turbine passage is further advantageous in miniaturizing the turbocharger.

According to the present invention as described above, it is possible to provide a turbocharger engine provided with a turbocharger including two independent turbo units, which enables to give large kinetic energy from exhaust air to turbines, and to attain miniaturization.

This application is based on Japanese Patent Application No. 2016-109078 filed on May 31, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. An engine, comprising:
an engine body including a cylinder and an engine output shaft; and
a turbocharger disposed adjacent to the engine body, and including an exhaust passage through which exhaust air is supplied from the engine body, and an intake passage through which intake air is supplied to the engine body to supercharge the intake air, wherein
the turbocharger includes
a first turbo unit provided with:
 a first turbine chamber communicating with the exhaust passage and configured to accommodate a first turbine,
 a first compressor chamber communicating with the intake passage and configured to accommodate a first compressor, and
 a first turbine shaft extending between the first turbine chamber and the first compressor chamber to connect between the first turbine and the first compressor, and
a second turbo unit provided with:
 a second turbine chamber communicating with the exhaust passage and configured to accommodate a second turbine,
 a second compressor chamber communicating with the intake passage and configured to accommodate a second compressor, and
 a second turbine shaft extending between the second turbine chamber and the second compressor chamber to connect between the second turbine and the second compressor,
the first turbine chamber is disposed on an upstream side of the second turbine chamber in the exhaust passage,
the first turbine shaft and the second turbine shaft are disposed to extend generally in a same direction as the engine output shaft,
the second turbo unit is disposed with respect to the engine body in such a manner that the second turbine shaft is farther from the engine output shaft than the first turbine shaft in a plan view of the cylinder and the engine body, in a plan view of the cylinder and the engine body, the first turbine shaft and the second turbine shaft are disposed non-parallel to each other in such a manner that a first distance between the first turbine shaft and the second turbine shaft at a first end on a turbine side is larger than a second distance between the first turbine shaft and the second turbine shaft at a second end on a compressor side, and in such a manner that a first extension line defined by extending an axis of the first turbine shaft toward a side of the first compressor chamber and a second extension line defined by extending an axis of the second turbine shaft toward a side of the second compressor chamber intersect with each other, and in a side view when the first turbine shaft and the second turbine shaft are viewed from a side of the first turbine chamber and the second turbine chamber, the engine body is located on a left side of the second turbo unit, the second turbine shaft is rotated clockwise around an axis thereof, and an intra-turbine passage from an exit of the first turbine chamber to an entrance of the second turbine chamber is disposed between a side of the engine body and the second turbine shaft.

2. The engine according to claim 1, wherein
A is a distance between an axis of the first turbine shaft and an axis of the second turbine shaft in a direction transverse to the direction of the engine output shaft, and B is an outer diameter of an impeller of the second turbine in the side view, the distance A is set in a range defined by the following formula:

$B/2 \leq A \leq B.$

3. The engine according to claim 2, wherein
the outer diameter of the impeller of the second turbine is larger than an outer diameter of an impeller of the first turbine.

4. The engine according to claim 2, further comprising:
a bypass passage disposed on a right side of the intra-turbine passage in the side view, and configured to bypass the first turbine chamber so as to guide exhaust air to be supplied from the engine body to the second turbine chamber.

5. The engine according to claim 4, wherein
a downstream end of the bypass passage joins the intra-turbine passage.

6. The engine according to claim 1, wherein
the second turbine chamber includes a scroll passage formed in a periphery of the second turbine, and
A is a distance between an axis of the first turbine shaft and an axis of the second turbine shaft in a direction transverse to the direction of the engine output shaft, B is an outer diameter of an impeller of the second turbine, and C is a diameter of an inlet portion of the scroll passage in the side view, the distance A is set in a range defined by the following formula:

$B/2 \leq A \leq B/2 + C.$

7. The engine according to claim 6, wherein
the outer diameter of the impeller of the second turbine is larger than an outer diameter of an impeller of the first turbine.

8. The engine according to claim 6, further comprising:
a bypass passage disposed on a right side of the intra-turbine passage in the side view, and configured to bypass the first turbine chamber so as to guide exhaust air to be supplied from the engine body to the second turbine chamber.

9. The engine according to claim 1, wherein
the second turbine is a turbine whose impeller has an outer diameter larger than an outer diameter of an impeller of the first turbine.

10. The engine according to claim 9, further comprising:
a bypass passage disposed on a right side of the intra-turbine passage in the side view, and configured to bypass the first turbine chamber so as to guide exhaust air to be supplied from the engine body to the second turbine chamber.

11. The engine according to claim 1, further comprising:
a bypass passage disposed on a right side of the intra-turbine passage in the side view, and configured to bypass the first turbine chamber so as to guide exhaust air to be supplied from the engine body to the second turbine chamber.

12. The engine according to claim 11, wherein
a downstream end of the bypass passage joins the intra-turbine passage.

* * * * *